United States Patent
Fouad et al.

(10) Patent No.: US 9,654,324 B2
(45) Date of Patent: May 16, 2017

(54) SYSTEM AND METHOD FOR GRASSMANNIAN SIGNALING IN A BROADBAND NETWORK

(71) Applicant: Huawei Technologies Canada Co., Ltd., Kanata (CA)

(72) Inventors: Yaser Fouad, Gatineau (CA); Ramy Gohary, Ottawa (CA); Halim Yanikomeroglu, Ottawa (CA); Hosein Nikopour, Ottawa (CA)

(73) Assignee: Huawei Technologies Canada Co., Ltd., Kanata (CA)

(*) Notice: Subject to any disclaimer, the term of this patent is extended or adjusted under 35 U.S.C. 154(b) by 91 days.

(21) Appl. No.: 14/702,220

(22) Filed: May 1, 2015

(65) Prior Publication Data

US 2015/0318970 A1    Nov. 5, 2015

Related U.S. Application Data

(60) Provisional application No. 61/987,995, filed on May 2, 2014.

(51) Int. Cl.
*H04L 5/00* (2006.01)
*H04L 27/26* (2006.01)

(52) U.S. Cl.
CPC ........ *H04L 27/2634* (2013.01); *H04L 5/0048* (2013.01); *H04L 5/0053* (2013.01); *H04L 5/0026* (2013.01)

(58) Field of Classification Search
None
See application file for complete search history.

(56) References Cited

U.S. PATENT DOCUMENTS

2005/0245258 A1* 11/2005 Classon ............... H04L 5/0037
                                                          455/434
2006/0018251 A1    1/2006 Park et al.
(Continued)

FOREIGN PATENT DOCUMENTS

WO    2015168628 A1    11/2015

OTHER PUBLICATIONS

Huawei Technologies, Inc., Notification of Transmittal of the International Search Report and the Written Opinion of the International Searching Authority, International Application No. PCT/US2015/028904, dated Jul. 29, 2015, 12 pages.
(Continued)

*Primary Examiner* — Kwang B Yao
*Assistant Examiner* — Adam Duda
(74) *Attorney, Agent, or Firm* — Slater Matsil, LLP

(57) ABSTRACT

An embodiment method includes determining, by a first network device, an equivalent coherence time of a narrowband network corresponding to the broadband network in accordance with a channel coherence time and a coherence bandwidth of the broadband network. The method further includes structuring, by the first network device, a Grassmannian symbol in accordance with the equivalent coherence time, generating, by the first network device, Grassmannian symbol sections by partitioning the Grassmannian symbol in accordance with the coherence bandwidth, and transmitting, by the first network device to a second network device, the Grassmannian symbol sections on subchannels within the coherence bandwidth.

23 Claims, 4 Drawing Sheets

(56) References Cited

U.S. PATENT DOCUMENTS

| | | | |
|---|---|---|---|
| 2006/0120395 A1 | 6/2006 | Xing et al. | |
| 2007/0191067 A1* | 8/2007 | Nguyen | H01Q 1/1257 455/562.1 |
| 2008/0031368 A1 | 2/2008 | Lndoff et al. | |
| 2009/0175363 A1* | 7/2009 | Hottinen | H04L 5/0044 375/260 |
| 2010/0054354 A1* | 3/2010 | Tosato | H04L 25/03898 375/260 |
| 2011/0013487 A1 | 1/2011 | Zhou et al. | |
| 2012/0263454 A1* | 10/2012 | Koike-Akino | H04B 10/5055 398/25 |
| 2015/0318970 A1 | 11/2015 | Fouad et al. | |

OTHER PUBLICATIONS

Fouad, et al., "Time-Frequency Grassmannian Signalling for MIMO Multi-Channel-Frequency-Flat Systems", IEEE Communications Letters, vol. 19, No. 3, Mar. 2015, pp. 475-478.

Gohary, et al., "Noncoherent MIMO Communication: Grassmannian Constellations and Efficient Detection", IEEE Transactions on Information Theory, vol. 55, No. 3, Mar. 2009, pp. 1176-1205.

Zheng, "Communication on the Grassmann Manifold: A Geometric Approach to the Noncoherent Multiple-Antenna Channel", IEEE Transactions on Information Theory, vol. 48, No. 2, Feb. 2002, pp. 359-383.

\* cited by examiner

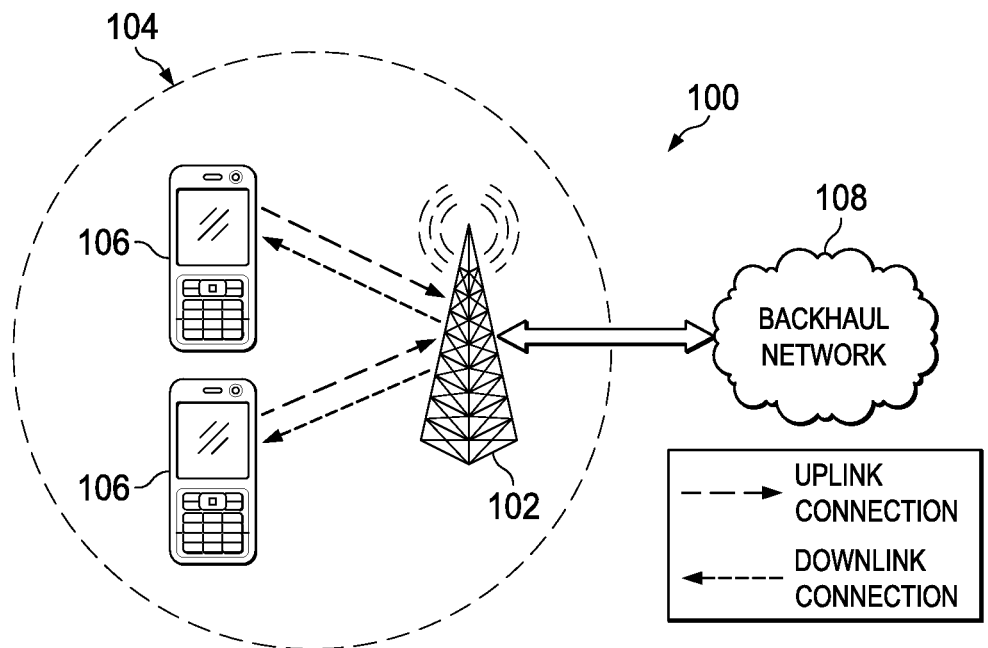
FIG. 1
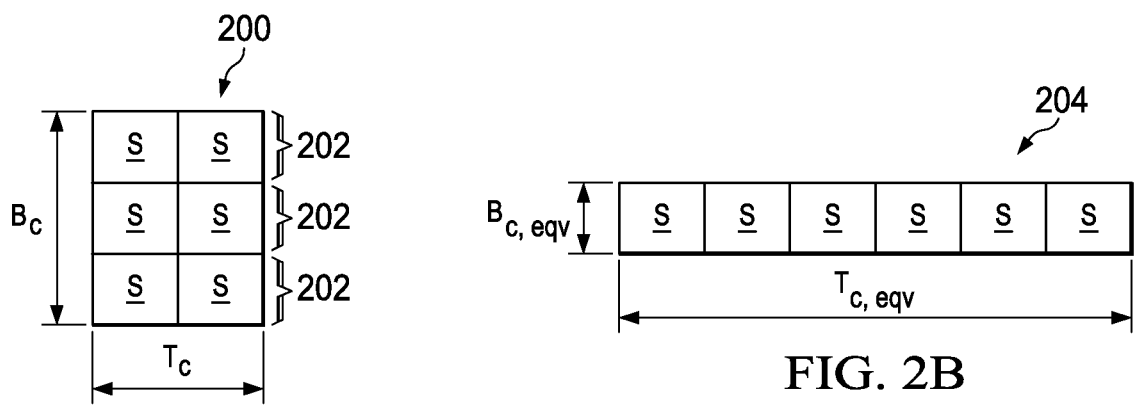
FIG. 2A
FIG. 2B

SYSTEM AND METHOD FOR GRASSMANNIAN SIGNALING IN A BROADBAND NETWORK

This application claims the benefit of U.S. Provisional Application No. 61/987,995, filed on May 2, 2014, entitled "System and Method for Grassmannian Signaling in a Broadband Network," which application is hereby incorporated herein by reference.

TECHNICAL FIELD

The present invention relates to a system and method for wireless communications, and, in particular embodiments, to a system and method for Grassmannian signaling for broadband communications.

BACKGROUND

Coherent communication schemes use pilot signals or training sequences for channel estimation modeling at the receivers. The overhead of the training sequences and/or pilot signals can be high for rapidly time-varying and frequency-selective channels. Also, the overhead increases with number of multiple-input multiple-output (MIMO) transmit antennas/layers. A non-coherent detection scheme, which can reduce the above described overhead, is desirable to mitigate or avoid this overhead.

SUMMARY

These and other problems are generally solved or circumvented, and technical advantages are generally achieved, by preferred embodiments of the present invention which provides a system and method for Grassmannian signaling in a broadband network.

In accordance with an embodiment, a method for communicating in a broadband network includes determining, by a first network device, an equivalent coherence time of a narrowband network corresponding to the broadband network in accordance with a channel coherence time and a coherence bandwidth of the broadband network. The method further includes structuring, by the first network device, a Grassmannian symbol in accordance with the equivalent coherence time, generating, by the first network device, Grassmannian symbol sections by partitioning the Grassmannian symbol in accordance with the coherence bandwidth, and transmitting, by the first network device to a second network device, the Grassmannian symbol sections on subchannels within the coherence bandwidth.

In accordance with another embodiment, a network transmitter includes a processor and a computer readable storage medium storing programming for execution by the processor. The programming includes instructions to determine an equivalent coherence time of a corresponding narrowband network in accordance with a channel coherence time and a coherence bandwidth of the broadband network, structure a Grassmannian symbol in accordance with the equivalent coherence time, partition the Grassmannian symbol into a number of Grassmannian symbol sections in accordance with the coherence bandwidth, and transmit, to a network receiver, the Grassmannian symbol sections on subchannels within the coherence bandwidth. Each of the Grassmannian symbol sections is transmitted on one of the subchannels within the coherence bandwidth.

In accordance with another embodiment, a method for communicating in a broadband network includes determining, by a first network device in the broadband network, a channel coherence time and a coherence bandwidth of the broadband network and receiving, by the first network device, Grassmannian symbol sections from a second network device on subchannels within the coherence bandwidth. The method further includes determining, by the first network device, a Grassmannian symbol in accordance with a combination of the Grassmannian symbols sections. The Grassmannian symbol is structured in accordance with the channel coherence time and the coherence bandwidth.

In accordance with yet another embodiment, a network receiver includes a processor and a computer readable storage medium storing programming for execution by the processor. The programming includes instructions to determine a channel coherence time and a coherence bandwidth of the broadband network, receive Grassmannian symbol sections from a network transmitter, wherein each of the Grassmannian symbol sections are received on a different subchannel within the coherence bandwidth, and determine a Grassmannian symbol in accordance with a concatenation of the Grassmannian symbols sections. The Grassmannian symbol is structured in accordance with the channel coherence time and the coherence bandwidth.

BRIEF DESCRIPTION OF THE DRAWINGS

For a more complete understanding of various embodiments, and the advantages thereof, reference is now made to the following descriptions taken in conjunction with the accompanying drawings, in which:

FIG. 1 illustrates a wireless communications network according to an embodiment;

FIGS. 2A and 2B illustrate subchannels in a time-frequency plane and concatenation of subchannels in an embodiment network;

DETAILED DESCRIPTION OF ILLUSTRATIVE EMBODIMENTS

Figure 3A:
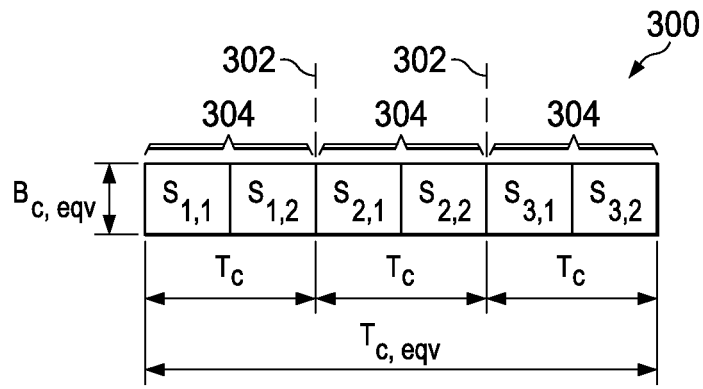
FIGS. 3A and 3B illustrate an example of structuring and transmitting a time-frequency Grassmannian symbol in an embodiment broadband network that utilizes a multi-carrier transmission system such as orthogonal frequency division multiple access (OFDMA)

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

FIG. 1 illustrates a network 100 for communicating data. Network 100 includes an access point (AP) 102 having a coverage area 104, a plurality of wireless devices 106, and a backhaul network 108. AP 102 may comprise any component capable of providing wireless access by, among other things, establishing uplink (dashed line) and/or downlink (dotted line) connections with the wireless devices 106. For example, AP 102 may comprise a base station, an enhanced base station (eNB), a femtocell, other wirelessly enabled devices, and the like. Wireless devices 106 may comprise any component capable of establishing a wireless connection with AP 102, such as a user terminal (UT), a user equipment (UE), a mobile station (STA), internet of things (IoT) devices, other wirelessly enabled devices, combinations thereof, or the like. Backhaul network 108 may be any component or collection of components that allow data to be exchanged between AP 102 and a remote end. In some embodiments, the network may comprise various other wireless devices, such as relays, low power nodes, coordinating devices, and the like.

Coherent communication schemes, commonly used in wireless systems, such as for multiple-input multiple output (MIMO) systems with multiple transmit and receive antennas, require instantaneous channel state information (CSI, e.g., channel coefficients) to be known at the receiver. This is usually accomplished by allocating a portion of available resources for transmitting training sequences and/or or pilot signals, to the receiver, which results in a reduction of the achievable rate of the network. The number of these training sequences increases linearly with the number of MIMO transmit antennas and is inversely proportional to the channel coherence time and bandwidth.

Practical wireless channels have time-varying characteristics and the instantaneous CSI of a given channel is not typically known at the receiver. This gives rise to a non-coherent communications channel. Potential gains over the transmission rates of a coherent communication system can be achieved by using a non-coherent communication scheme that does not require the acquisition of CSI (e.g., the instantaneous channel coefficients do not need to be known at the transmitter nor at the receiver). Excessive proliferation of training symbols can be avoided and higher data rates can be enabled by utilizing signaling schemes in network 100 that do not require explicit acquisition of instantaneous CSI. Throughout the description, a non-coherent communications network is used to designate a network where instantaneous CSI (e.g., channel coefficients) are not known by network receivers.

In an embodiment non-coherent network, Grassmannian signaling is used to achieve high signal to noise (SNR) block-fading channel capacity. The term Grassmannian signaling is used to describe a communication scheme that generates and structures Grassmannian symbols substantially independently of instantaneous CSI using a geometric object known as a Grassmannian manifold. It has been observed that communication at the channel capacity of high signal to noise ratio (SNR) channels can be achieved in a non-coherent manner if in each transmission, the data is encoded in a subspace spanned by a unitary matrix referred to as a Grassmannian symbol. For example, consider the three axes, x, y, and z. In a coherent system, when a signal X is transmitted on the x-axis, the receiver receives HX where H is the channel effect. Ideally, in order to decode the signal, the receiver must be aware of instantaneous CSI (e.g., H). However, in Grassmannian signaling, the transmission is embedded within the axis itself (e.g., the x-axis in the above example). Thus, the value of H is not necessary to decode the transmitted vector.

For high speed communications, higher dimensional axes (referred to as subspaces) are used to transmit signals. In narrowband systems that utilize Grassmannian signaling, the transmitted Grassmannian symbols assume the form of "tall" space-time unitary matrices that are isotropically distributed on a Grassmannian manifold. In the description, "tall" matrices are used to refer to a matrix having dimensions T×R where T is greater than R. In embodiments discussed below, T is at least twice R. Each of these unitary matrices corresponds to a unique R-dimensional subspace. A geometric object known as the Grassmannian manifold includes the set of all R-dimensional subspaces. Subsequently, each point on the Grassmannian manifold is a unitary matrix that is isotropically distributed over one subspace (each point is a unitary matrix that represents a unique subspace). Each of the Grassmannian symbols or segments thereof, is transmitted by available transmit antennas over the duration of a channel coherence interval in a capacity achieving embodiment. In another embodiment, the Grassmannian symbol may be transmitted over a shorter duration than the channel coherence interval. At the receiver side, the Grassmannian symbol is detected by identifying its subspace within the Grassmannian manifold. Other suitable Grassmannian signaling schemes may also be used.

In some aspects, overhead training sequences may still be used to enable link adaptation in the network. However, these link adaptation overhead training sequences may be less frequent than training symbols needed to measure instantaneous CSI in networks where symbol modulation size and code rate depends on instantaneous CSI. In an embodiment network, sets of Grassmannian symbols may be generated by a network developer/operator offline (e.g., when a network and/or network devices are being designed). A plurality of Grassmannian symbol sets of varying dimensions, each corresponding to a different constellation size, may be generated and stored locally (e.g., in the form of lookup tables) at various network transmitting/receiving devices (e.g., AP 102 and wireless devices 106). During a link adaptation phase of network communications, a network controller or scheduler (e.g., AP 102 or other controlling device) may select a suitable dimension and/or transmission rate for a Grassmannian symbol set from the stored ones (e.g., in the lookup tables) in accordance with network parameters (e.g., average channel quality information (CQI), channel coherence time, channel coherence bandwidth, and the like). The network controller may report this information (e.g., CQI, channel coherence time, channel coherence bandwidth, dimension, size of constellation, and/or transmission rate) or a subset of this information to network devices (e.g., wireless devices 106) during control signaling for resource scheduling phase, for example. Unreported link adaptation parameters may be blindly detected by network devices (e.g., wireless devices 106). The reporting of these link adaptation parameters may be either dynamic (e.g., signaled every scheduling interval) or persistent (e.g., signaled only when parameter changes or at periodic intervals). In some embodiments, the CQI, channel coherence time, and channel coherence bandwidth may be determined by taking measurements of channel quality. As will be explained in greater detail below, such channel measurements may be taken by devices (e.g., wireless devices 106) and reported to the network controllers either implicitly or explicitly. Thus, training signals may still be used for link adaptation in an embodiment network. In such embodiments, the resources used for training signals may be lower than those used in systems using instantaneous CSI for coherent communications. Thus, Grassmannian symbols may be transmitted, received, and detected by network devices (e.g., AP 102 and wireless devices 106) without explicit instantaneous CSI acquisition, and the network resources used for the transmission of training symbols may be reduced.

An embodiment network is further adapted to allow for high SNR Grassmannian signaling for broadband as well as narrowband systems. Throughout the description, a broadband system is considered to be one in which the coherence bandwidth (e.g., the bandwidth of correlated subchannels) is greater than the bandwidth of one channel use (e.g., one orthogonal frequency-division multiplexing (OFDM) subchannel in OFDM systems). In contrast, a narrowband system is one in which the coherence bandwidth is equal to the bandwidth of one channel use (e.g., one OFDM subchannel in OFDM systems). In an embodiment network, channel coefficients are correlated across time and frequency, which implies that rate-efficient signaling ought to be jointly structured over these domains. Using only narrowband Grassmannian signaling (e.g., Grassmannian signaling in which the transmitted symbols are not structured in accordance with the channel coherence bandwidth) in broadband systems incurs a significant loss in spectral efficiency and/or the achievable rate because such signaling independently structures transmitted symbols over individual subchannels within the coherence bandwidth. By providing a structure for Grassmannian signaling in a broadband system, spectral efficiency and the achievable rate of the resulting network is increased. An embodiment network further allows Grassmannian signaling when the channel coefficients (e.g., between transmit and receive antennas on network devices) assume an independent (or substantially independent) realization in each channel use (e.g., fast fading systems). For example, channel coefficients between transmit antennas of a network transmitter and receive antennas of a network receiver are slightly correlated between consecutive channel uses in the time domain, but are highly correlated between multiple subchannels within the coherence bandwidth.

An embodiment enables non-coherent Grassmannian signaling for broadband MIMO communication systems, such as network 100. An embodiment includes a concatenation technique that jointly structures each Grassmannian symbol in both time and frequency. It therefore enables the signaling scheme to utilize the temporal and spectral correlation between channel coefficients. An embodiment provides time-frequency concatenated Grassmannian signaling in MIMO broadband systems. Embodiments may be implemented in wireless access standards, distributed networks, and devices, such as mobile terminals, machine-type communication devices, and evolved Node Bs (eNBs).

Furthermore, an embodiment concatenation technique efficiently utilizes Grassmannian constellations for narrowband systems in broadband systems. Thus, the technique may not add any additional computational complexity to that of narrowband Grassmannian signaling. Because an embodiment technique structures the Grassmannian symbol across multiple subchannels, it enables the application of Grassmannian signaling when network 100 is a fast fading system as long as network 100's coherence bandwidth exceeds that of one subchannel (e.g., tone-hopping systems). Additionally, an embodiment concatenation technique is independent of the transmitted symbol duration and subchannel bandwidth (e.g., the OFDM symbol duration and subchannel bandwidth in OFDM systems), therefore the embodiment concatenation technique is compatible with legacy transmit filter designs.

For concatenated time-frequency Grassmannian signaling, an embodiment OFDM system (or other suitable system) communicates over a block-fading, or approximately block-fading, channel where a network transmitter has M transmit antennas, a network receiver has N receive antennas, and where the number of receive antennas is greater than or equal to the number of transmit antennas (e.g., N≥M). Network transmitters and network receivers may include any of the APs 102 and/or wireless devices 106 as described above. FIG. 2A illustrates a block diagram of a time-frequency channel block 200. The channel coherence time $T_c$ and coherence bandwidth $B_c$, are given in a number of OFDM symbols S and subchannels 202, respectively. Each OFDM symbol has a duration $T_s$. Channel coefficients between transmit and receive antennas are assumed to be: (1) substantially constant or correlated for a $T_c \times B_c$ time-frequency channel block 200 and (2) acquire substantially independent (e.g., highly uncorrelated) realizations between consecutive coherence blocks 200. FIG. 2A illustrates a particular number of OFDM symbols S within channel coherence time $T_c$ (e.g., two) and a particular number of subchannels 202 (e.g., three) within coherence bandwidth $B_c$. However, an embodiment broadband network may include any number of OFDM symbols S in coherence time $T_c$ and any number of subchannels 202 in coherence bandwidth $B_c$ as long as the coherence bandwidth $B_c$ includes more than one subchannel.

In various embodiments, both network transmitters and receivers are aware of the coherence time $T_c$ and coherence bandwidth $B_c$. Network transmitters and receivers may determine the coherence time $T_c$ and coherence bandwidth $B_c$ using any suitable method. For example, in frequency division duplexing (FDD) systems for downlink transmissions, wireless devices 106 (network receivers) perform measurements of pilot signals (or other overhead training signaling) to determine the channel coherence time $T_c$ and coherence bandwidth $B_c$. Wireless devices 106 may then report the coherence time $T_c$ and the coherence bandwidth $B_c$ to APs 102 (network transmitters). Pilot density for channel coherence time $T_c$ and coherence bandwidth $B_c$ measurement can be relatively low (e.g., lower than legacy training signals) to preserve network resources. For example, an embodiment pilot density to measure the coherence time could be as low as zero per scheduling interval if the Doppler frequency does not change (e.g., the relative speed between the transmitter and the receiver is constant for this duration). In other embodiments during downlink, wireless devices 106 may use purely data based estimation methods for determining the channel coherence time $T_c$ and coherence bandwidth $B_c$ without training sequences. For uplink transmissions, APs 102 (network receivers) select measure channel coherence time $T_c$ and coherence bandwidth $B_c$ in accordance with sounding signals transmitted by the network transmitter (wireless devices 106). APs 102 may then transmit these values to wireless devices 106 (network transmitters) when wireless devices 106 are granted network access, for example.

As another example, in calibrated time division duplexing (TDD) systems during downlink transmissions, APs 102 (network transmitters) measure sounding signals and determine (e.g., select) the channel coherence time $T_c$ and coherence bandwidth $B_c$ in accordance with the sounding signals. The sounding signals may be transmitted by wireless devices 106 (network receivers). These measurements are communicated to wireless devices 106 (network receivers) during a resource scheduling phase through dynamic control signaling, for example. For uplink transmissions in TDD systems, a similar approach to the FDD uplink scenario may be used. For example, APs 102 (network receivers) may perform measurements of sounding signals (e.g., transmitted by wireless devices 106) and determine coherence time $T_c$ and coherence bandwidth $B_c$ from the sounding signals. APs 102 may communicate these values to wireless devices 106 (network transmitters) when wireless devices 106 are granted network access, for example. Communication of the channel coherence time $T_c$ and coherence bandwidth $B_c$ may be reported either explicitly or implicitly by APs 102 in uplink and/or downlink. In an embodiment, explicit reporting may include a first network device directly transmitting the channel coherence time $T_c$ and coherence bandwidth $B_c$ to a second network device either by directly sending the absolute value or sending an indicator that corresponds to one or more lookup tables for channel coherence time $T_c$, coherence bandwidth $B_c$, or a combination of two. The lookup tables may be predefined by a system operator and known to both transmitting and receiving devices. In an embodiment, implicit reporting may include transmitting parameters of channel coherence time $T_c$ and coherence bandwidth $B_c$ (e.g., CQI, movement speed of a mobile device, and the like). In such an embodiment, channel coherence time $T_c$ and coherence bandwidth $B_c$ may be calculated in accordance with these parameters.

Furthermore, in some embodiments, a total number of possible combinations of the channel coherence time $T_c$ and coherence bandwidth $B_c$ may be limited by an applicable standard, which may be known to both network transmitters and receivers. Alternatively, during uplink in TDD systems, wireless devices 106 may measure channel coherence time $T_c$ and coherence bandwidth $B_c$ from downlink pilot signals/training sequences. In such embodiments, APs 102 may blindly detect the values of channel coherence time $T_c$ and coherence bandwidth $B_c$ using a blind estimation techniques such as the subspace method, or wireless devices may report the channel coherence time $T_c$ and coherence bandwidth $B_c$ to APs 102 prior to transmission.

In various embodiments, an equivalent coherence time $T_{c,eqv}$ of a narrowband network corresponding to the broadband network is determined by network transmitters and receivers based on channel coherence time $T_c$ and coherence bandwidth $B_c$. In some embodiments, the equivalent coherence time $T_{c,eqv}$ may be measured and transmitted by one network device to another network device in lieu of or in addition to the channel coherence time $T_c$ and coherence bandwidth $B_c$ as described above (e.g., through explicit or implicit signaling). In the described exemplary embodiments, a corresponding narrowband network is one having channel characteristics such that: (1) the coherence bandwidth is one and (2) the coherence time $T_{c,eqv}$ is in accordance with the broadband network's channel coherence time $T_c$ and coherence bandwidth $B_c$. For example, the subchannels 202 within the coherence bandwidth $B_c$ of the broadband system of network 100 are concatenated to obtain a corresponding narrowband system's coherence time block duration 204 without affecting the broadband system's underlying pulse characteristics as illustrated by FIG. 2B. After concatenation, an equivalent coherence time $T_{c,eqv}$ of the corresponding narrowband system is equal to the product of the channel coherence time $T_c$ and the number of subchannels 202 in the coherence bandwidth $B_c$. The narrowband system's equivalent coherence bandwidth, $B_{c,eqv}$, is one subchannel so that it mimics a narrowband network. Put another way, the coherence block 200 of the broadband system is concatenated so that the broadband network coherence block mimics a narrowband network (referred to as the corresponding narrowband network). For example, in the embodiment illustrated by FIGS. 2A and 2B, the equivalent channel coherence time $T_{c,eqv}$ is six symbols, which is the product of: (1) the number of symbols S in the coherence time $T_c$ (e.g., two) and (2) the number of subchannels 202 in the coherence bandwidth $B_c$ (e.g., three).

After the broadband channel is transformed into a corresponding narrowband one, capacity achieving communication can be achieved (even at high SNRs) using $T_{c,eqv} \times M$ Grassmannian signaling (e.g., the dimensions of each structured Grassmannian symbol is $T_{c,eqv} \times M$). Put another way, network transmitters structure Grassmannian symbols in accordance with the coherence time $T_c$ and coherence bandwidth $B_c$ for transmission to network receivers to achieve channel capacity at high SNRs. The transmitted Grassmannian symbol is structured to have dimensions of $T_{c,eqv} \times M$, where $T_{c,eqv}$ represents the equivalent coherence time.

Figure 3B:
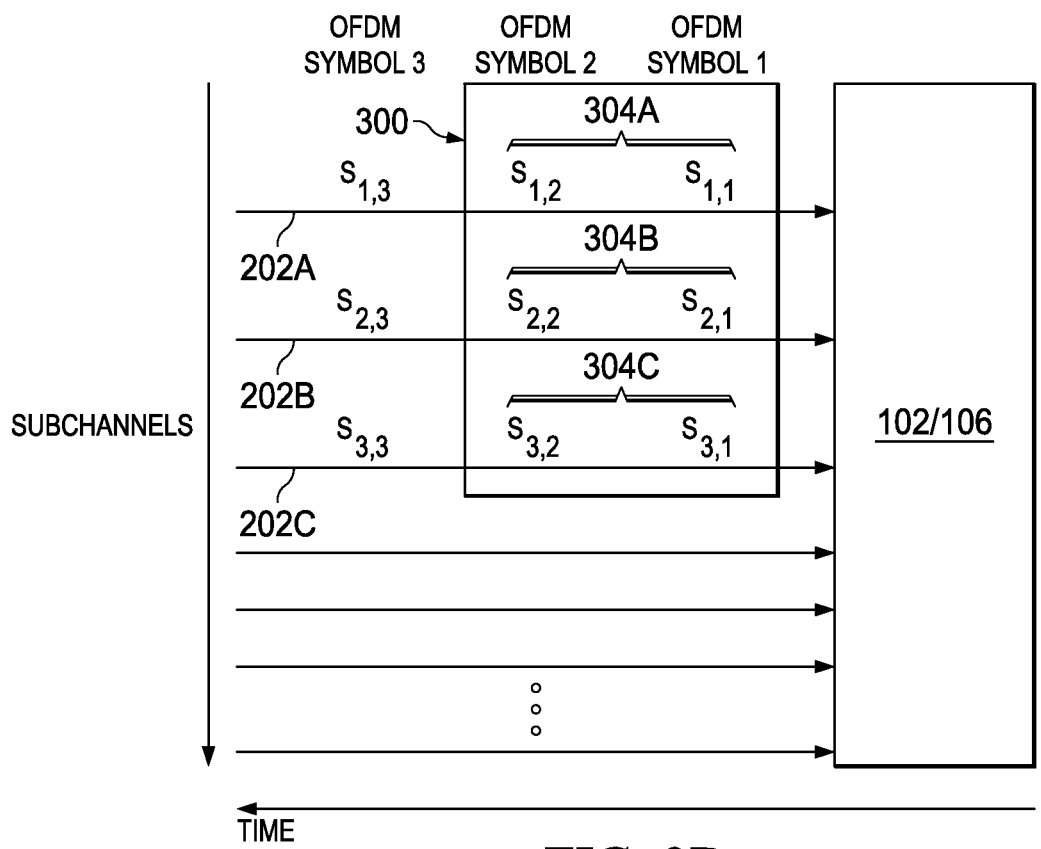

After the Grassmannian symbol is structured as described above, each $T_{c,eqv} \times M$ Grassmannian symbol is partitioned into $T_c \times M$ submatrices, each of which is then transmitted on one subchannel 202 within $B_c$. FIGS. 3A and 3B illustrates block diagrams of a Grassmannian symbol and transmitting Grassmannian symbols according to some embodiments. In FIG. 3A, a $T_{c,eqv} \times M$ Grassmannian symbol 300 is illustrated. Symbol 300 is structured by a network transmitter in a network having time-frequency channel characteristics as described above in FIGS. 2A and 2B. For ease of illustration, M is equal to one in FIG. 3A although in practice, a network transmitter may include any number of transmit antennas. After structuring, the Grassmannian symbol 300 is partitioned into Grassmannian symbol sections 304 (illustrated by dotted lines 302), where each Grassmannian symbol section 304 is a $T_c \times M$ submatrix. Each Grassmannian symbol section 304 has a length equal to the channel coherence time $T_c$ (e.g., two symbols S in the illustrated embodiments). After Grassmannian symbol 300 is partitioned, the network transmitter transmits the Grassmannian symbol sections 304 on subchannels 202 within the coherence bandwidth $B_c$ to the network receiver in an example OFDM system (e.g., AP 102 and/or wireless device 106) as illustrated by FIG. 3B. In FIG. 3B, symbol $S_{i,j}$ refers to the complex number transmitted on subcarrier i at OFDM symbol j. Each Grassmannian symbol section 304 may be transmitted on a different subchannel 202. For example, in FIG. 3B, Grassmannian symbol section 304A (having symbols $S_{1,1}$ and $S_{1,2}$) is transmitted on subchannel 202A, Grassmannian symbol section 304B (having symbols $S_{2,1}$ and $S_{2,2}$) is transmitted on subchannel 202B, and Grassmannian symbol section 304C (having symbols $S_{3,1}$ and $S_{3,2}$) is transmitted on subchannel 202C. In the illustrated embodiment, subchannels 202A, 202B, and 202C are all the subchannels within a coherence bandwidth $B_c$. Thus, a Grassmannian symbol 300 may be structured, partitioned, and transmitted over symbols within the coherence time $T_c$, on subchannels within coherence bandwidth $B_c$, and transmit antennas M.

A more detailed description of transmitting a Grassmannian symbol in both narrowband and broadband systems according to various embodiments is as follows. Consider an example narrowband OFDM system where a channel use duration $T_s$, spans one OFDM symbol and the subchannel bandwidth $B_s$ corresponds to the bandwidth of one OFDM subchannel. In the narrowband system, Grassmannian signaling is used for high SNR communications over a block Rayleigh fading channel in which the coefficients assume substantially independent realizations (e.g., highly uncorrelated realizations) between consecutive blocks. For each block of duration $T_c$, a symbol, $X^{(k)} \in \mathbb{C}^{T_c \times M}$, is transmitted over a subchannel $k \in \{1, \ldots, B_c\}$. The (t,m)-th entry of $X^{(k)}$ represents the transmitted pulse at time $t \in \{1, \ldots, T_c\}$, by transmit antenna $m \in \{1, \ldots, M\}$, over subchannel k. In such a subchannel, the channel gains matrix and the received symbol are denoted by $H^{(k)} \in \mathbb{C}^{M \times N}$ and $Y^{(k)} \in \mathbb{C}^{T_c \times N}$, respectively, where $$Y^{(k)} = X^{(k)} H^{(k)} + W^{(k)} \qquad \text{Equation (1)}$$

The (t,n)-th entry of $Y^{(k)}$ represents the received pulse at time t, by the n∈{1, . . . , N} receive antenna, and $[W^{(k)}]_{T_c \times N} \sim C\mathbb{N}(0,1)$ (complex white Gaussian noise with zero mean and unit variance per real dimension). For a broadband system, an corresponding single-channel system structure for the Grassmannian symbol is obtained as discussed above. The system model of the corresponding single-channel system can be obtained by modifying Equation 1 as follows:

$$\overline{Y} = \overline{X}H + \overline{W} \qquad \text{Equation(2)}$$

where $\overline{Y} = [Y^{(1)^T} \ldots Y^{(Bc)^T}]^T$ is the $T_{c,eqv} \times N$ received signal matrix, $\overline{X} = [X^{(1)^T} \ldots X^{(Bc)^T}]^T$ is the $T_{c,eqv} \times M$ transmitted Grassmannian symbol, and $\overline{W} = [W^{(1)^T} \ldots W^{(Bc)^T}]^T$ is the $T_{c,eqv} \times N$ additive white Gaussian noise matrix. Since the block-fading channel is assumed to be substantially constant, or highly correlated, over a $T_c \times B_c$ time-frequency block (e.g., block 200), the channel coefficients matrix, H, is constant, or substantially constant, across all subchannels within $B_c$ (e.g., $H^{(k)} \approx H$, $\forall k \in \{1, \ldots, B_c\}$).

By translating a broadband frequency-flat system into an corresponding narrowband one, capacity-achieving communication at high SNRs can be established using Grassmannian signaling, but in $G(T_{c,eqv}, M)$ instead of $G(T_c, M)$. The dimensions of each embodiment Grassmannian symbol is $T_{c,eqv} \times M$, instead of $T_c \times M$. However, unlike the narrowband case in which each Grassmannian symbol is sent independently over one subchannel, in the corresponding narrowband system for broadband transmissions, each Grassmannian symbol is transmitted over multiple subchannels within $B_c$. In particular, each $T_{c,eqv} \times M$ Grassmannian symbol is partitioned into $T_c \times M$ submatrices each of which is then transmitted on one of the subchannels within $B_c$ as described above. This introduces a structure between the signal matrices transmitted over different subchannels, thus enabling the utilization of all the available $\Psi_{T_c B_c}$ degrees of freedom.

At the receiver side, the Grassmannian symbol 300 (e.g., the $T_{c,eqv} \times M$ matrix) can be recovered by detecting the transmitted Grassmannian symbol sections 304 on subchannels 202. The network receiver may be aware of which subchannels to detect, for example, from resource allocations, which may be sent over control channels in network 100. After the receiver (e.g., AP 102 and/or wireless devices 106) receives the Grassmannian symbol sections 204, the receiver may determine the Grassmannian symbol 300 by detecting the concatenated Grassmannian symbol sections 204 that are received on the subchannels 202.

Unlike the narrowband Grassmannian in which each symbol is sent independently over one subchannel, an embodiment concatenation technique introduces a structure between the signal matrices transmitted over different subchannels. This enables the utilization of the correlation between the channel coefficients over the time-frequency channel block. Since the subchannel concatenation that underlies the proposed technique is a reversible operation, the $T_{c,eqv} \times M$ signal matrix can then be recovered at the receiver side by detecting a combination of the submatrices received on the $B_c$ subchannels. For example, the receiver may detect a concatenation of the submatrices received on the subchannels.

An embodiment structures Grassmannian symbols in an OFDMA system (or other suitable system). When using the time-frequency Grassmannian constellation obtained by an embodiment in an OFDMA system, the complex numbers that modulate the subcarriers will be determined by the Grassmannian symbol being transmitted. In particular, each of these complex numbers will correspond to an entry of the unitary matrix; i.e., the Grassmannian symbol. This is in contrast with coherent systems in which the complex numbers correspond to symbols from a quadrature amplitude modulation (QAM) constellation. By feeding these jointly structured complex numbers to the inverse fast Fourier transform (IFFT) block, a time-frequency Grassmannian symbol is structured across multiple subchannels and OFDMA symbol durations.

In another embodiment, Grassmannian symbol sections may be transmitted only on a subset of subchannels in the coherence bandwidth. For example, gains may still be achieved by transmitting symbols on a subset of subchannels with the coherence bandwidth $B_c$ instead of all subchannels within the coherence bandwidth $B_c$. In such embodiments, channel coherence time $T_{c,eqv}$ is equal to a product of (1) the channel coherence time $T_c$ and (2) a number of utilized channels $B_c'$ within the subset of the coherence bandwidth where $1 < B_c' \leq B_c$. The number of transmitted Grassmannian symbol sections is greater than one and up to a total number of subchannels $B_c$ in the coherence bandwidth.

Figure 4:
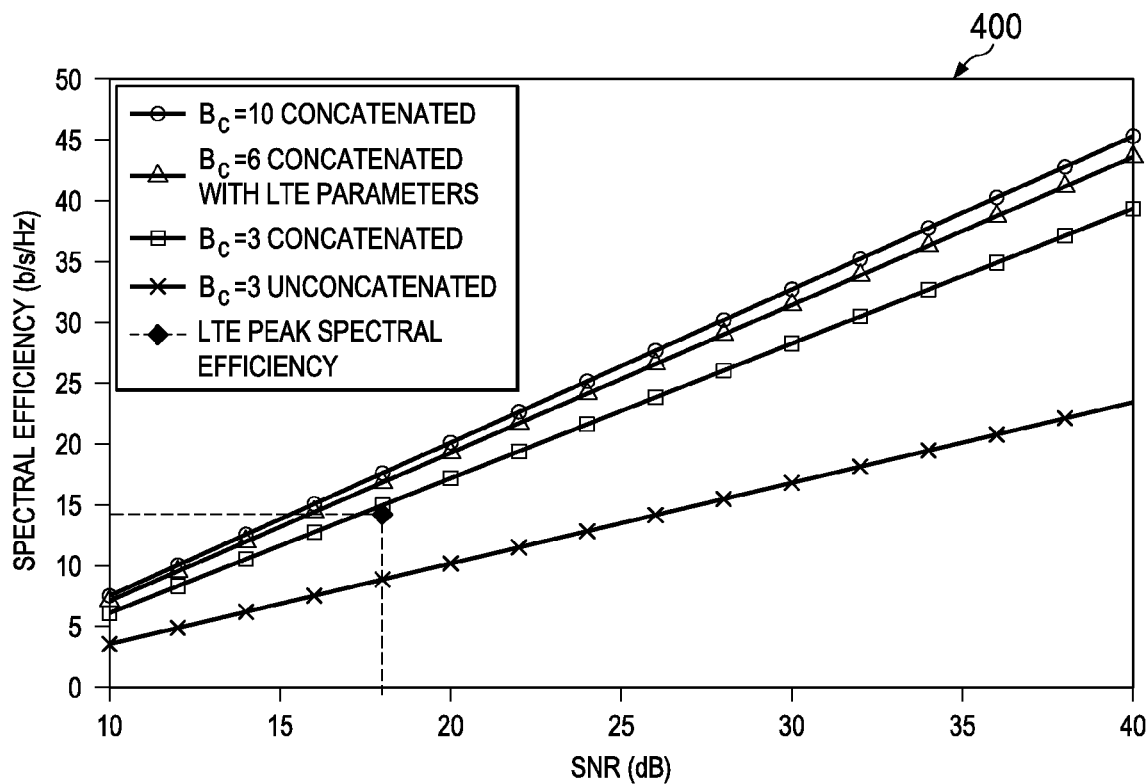
FIG. 4 illustrates a graph of simulation results of transmission gains in embodiment networks.

FIG. 4 illustrates simulation results 400 of the spectral efficiency of concatenated and narrowband Grassmannian signaling with M=N=4 and $T_c$=8 against the LTE peak spectral efficiency. Simulation results for when the coherence bandwidth includes three, six, and ten subchannels are illustrated for a concatenated Grassmannian signaling system. It has been observed that when applied in broadband systems, concatenated time-frequency Grassmannian signaling significantly outperforms a counterpart system without concatenation.

Figure 5A:
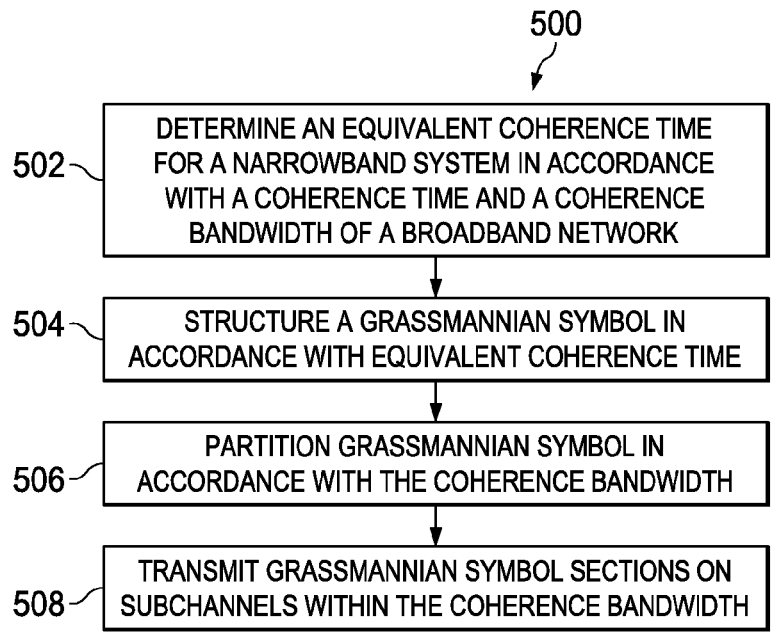
FIGS. 5A and 5B illustrate process flows for transmissions in an embodiment network.

FIG. 5A illustrates a process flow for transmitter operations 500 according to some embodiments. The transmitter (e.g., AP 102 or wireless device 106) may operate in a broadband network. In step 502, the transmitter determines an equivalent coherence time (e.g., $T_{c,eqv}$) for a corresponding narrowband system in accordance with a coherence time and a coherence bandwidth of the broadband network. For example, the transmitter determines an equivalent coherence time in accordance with a coherence bandwidth and coherence time of the broadband network in order to mimic a narrowband network that corresponds to the broadband network. For example, the equivalent coherence time may equal a product of the coherence time and up to a number of subchannels within the coherence bandwidth.

In step 504, the transmitter structures a Grassmannian symbol in accordance with the equivalent coherence time. For example, Grassmannian symbol may be structured to have dimensions of $T_{c,eqv} \times M$ where M is the number of transmit antennas at the transmitter (e.g., as described above with respect to FIG. 2B). In step 506, the transmitter partitions the Grassmannian symbols into Grassmannian symbol sections in accordance with the coherence bandwidth (e.g., as described above with respect to FIG. 3A). For example, the number of Grassmannian symbol sections may be greater than one and up to a total number of subchannels within the coherence bandwidth. In step 508, the transmitter transmits the Grassmannian symbol sections to a receiver over subchannels in the coherence bandwidth. For example, each Grassmannian symbol section may be transmitted over a separate subchannel in the coherence bandwidth.

Figure 5B:
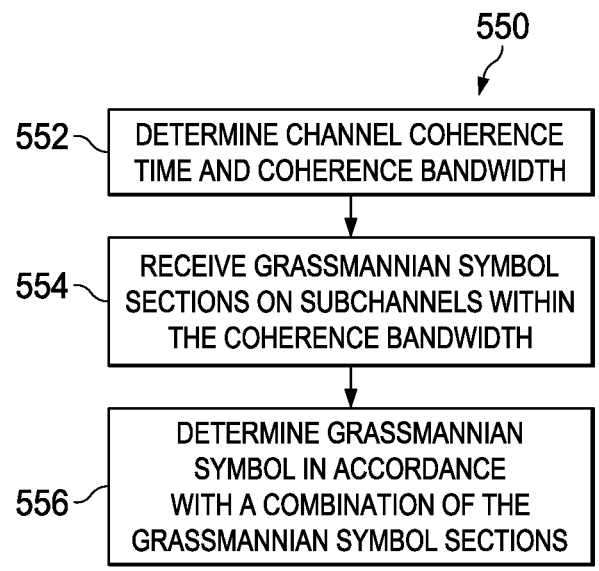

FIG. 5B illustrates a process flow for receiver operations 550 according to some embodiments. The receiver (e.g., AP 102 or wireless device 106) may operate in a broadband network. In step 552, the receiver determines the channel coherence time (e.g., $T_c$) and the coherence bandwidth (e.g., $B_c$) of the broadband network. In step 554, the receiver receives Grassmannian symbol sections that are transmitted on subchannels within the coherence bandwidth. For example, each of the Grassmannian symbol sections may be received on a different subchannel within the coherence bandwidth. In step 556, the receiver detects the Grassmannian symbol in accordance with a combination of the received Grassmannian symbol sections. For example, the receiver may concatenate the received Grassmannian symbol sections received on the subchannels within the coherence bandwidth and detect the Grassmannian symbol from the concatenated Grassmannian symbol sections. The Grassmannian symbol may be structured in accordance with the channel coherence time as well as the coherence bandwidth. For example, dimensions of the Grassmannian symbol matrix may be an equivalent coherence time for a corresponding narrowband system by a number of transmit antennas at the transmitter. The equivalent coherence time is a product of the channel coherence time and up to a number of utilized subchannels within the coherence bandwidth.

An embodiment low complexity concatenation technique yields rate-efficient time-frequency Grassmannian signaling scheme with following features. It is independent of the underlying pulse duration and bandwidth of the system, and thus is compatible with transmit filter designs in current communication systems. The selection of the Grassmannian constellation dimensions for the corresponding narrowband system is based on the number of subchannels within the coherence bandwidth as well as the channel coherence time. An embodiment concatenated Grassmannian signaling scheme jointly structures the transmitted symbols over the time-frequency channel block. Thus, unlike its narrowband counterpart, it utilizes the spectral correlation between the subchannels within the coherence bandwidth. The concatenated Grassmannian signaling scheme can be applied in broadband systems without incurring a loss in the spectral efficiency. The scheme achieves the high SNR non-coherent block-fading channel capacity when the channel coefficients are substantially constant over a time-frequency block. The concatenated Grassmannian signaling scheme is applicable in fast fading systems with coherence bandwidth exceeding that of one subchannel. The concatenation technique is not computationally expensive.

Figure 6:
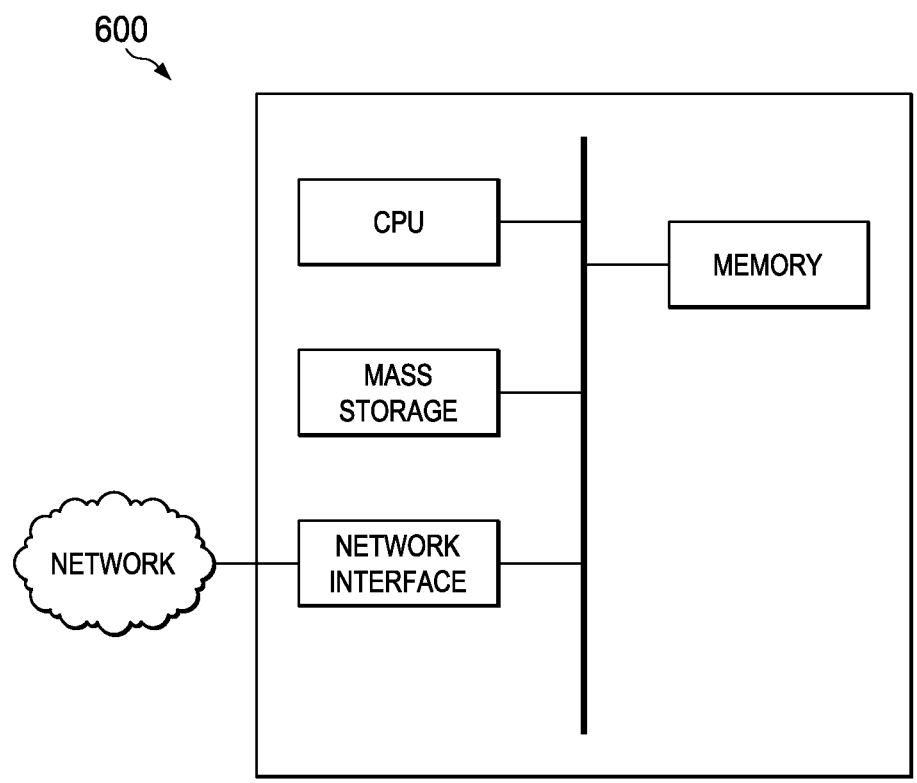
FIG. 6 illustrates a computing platform that may be used for implementing, for example, the devices and methods described herein, in accordance with an embodiment.

FIG. 6 is a block diagram of a processing system 600 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing unit may include a central processing unit (CPU), memory, a mass storage device, a network interface, etc., connected to a bus.

The bus may be one or more of any type of several bus architectures including a memory bus or memory controller, a peripheral bus, video bus, or the like. The CPU may comprise any type of electronic data processor. The memory may comprise any type of non-transitory system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of non-transitory storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

An embodiment method for communicating in a broadband network includes determining, by a first network device, an equivalent coherence time of a narrowband network corresponding to the broadband network in accordance with a channel coherence time and a coherence bandwidth of the broadband network. The method further includes structuring, by the first network device, a Grassmannian symbol in accordance with the equivalent coherence time, generating, by the first network device, Grassmannian symbol sections by partitioning the Grassmannian symbol in accordance with the coherence bandwidth, and transmitting, by the first network device to a second network device, the Grassmannian symbol sections on subchannels within the coherence bandwidth.

The embodiment method may further include determining the equivalent coherence time comprises taking a product of the channel coherence time and a number of utilized subchannels within the coherence bandwidth, wherein the number of utilized subchannels within the coherence bandwidth is greater than one and up to a total number of subchannels within the coherence bandwidth.

In an embodiment, transmitting the plurality of Grassmannian symbol sections may include transmitting each of the Grassmannian symbol sections on a different one of the subchannels within the coherence bandwidth.

In an embodiment, determining the channel coherence time and the coherence bandwidth may include receiving the channel coherence time and the coherence bandwidth in a report from the second network device. The report is received when the second network device is granted network access or during a feedback interval.

In an embodiment, determining the channel coherence time and the coherence bandwidth may include measuring, by the first device, sounding signals transmitted from the second device, and selecting, by the first device, the channel coherence time and the coherence bandwidth in accordance with the sounding signals. The method may further comprise reporting the channel coherence time and the coherence bandwidth, selected by the first device, to the second network device. Reporting the channel coherence time and the coherence bandwidth may include reporting the channel coherence time and the coherence bandwidth, selected by the first device, during a dynamic control signaling for resource scheduling phase.

In an embodiment, determining the channel coherence time and the coherence bandwidth in an embodiment may include measuring, by the first network device, downlink pilot signals, training sequences, or a combination thereof determining the channel coherence time and the coherence bandwidth in accordance with the downlink pilot signals, the training sequences, or the combination thereof, reporting the channel coherence time and the coherence bandwidth to the second network device. In this embodiment, the first network device may be a wireless device, and the second network device may be an access point.

In an embodiment, generating the Grassmannian symbol sections may include partitioning the Grassmannian symbol into a number of Grassmannian symbol sections, wherein the number of Grassmannian symbol sections is equal to a number of utilized subchannels within the coherence bandwidth, and wherein the number of utilized subchannels within the coherence bandwidth is greater than one and up to a total number of subchannels within the coherence bandwidth.

In an embodiment, the broadband network may be an orthogonal frequency division multiple access (OFDMA) network.

In an embodiment, the first device may comprise a plurality of predefined Grassmannian constellations, wherein the Grassmannian symbol is one of a plurality of Grassmannian symbols within the plurality of predefined Grassmannian constellations. In such an embodiment, the method may include selecting, by the first device, the Grassmannian symbol in accordance with a channel quality index, the channel coherence time, the coherence bandwidth, or a combination thereof. The first device may signal at least a portion of the channel quality index, the channel coherence time, the coherence bandwidth, or a combination thereof to the second device during a dynamic control signaling for resource scheduling phase.

An embodiment network transmitter in a broadband network includes a processor; and a computer readable storage medium storing programming for execution by the processor. The programming including instructions to determine an equivalent coherence time of a corresponding narrowband network in accordance with a channel coherence time and a coherence bandwidth of the broadband network, structure a Grassmannian symbol in accordance with the equivalent coherence time, partition the Grassmannian symbol into a number of Grassmannian symbol sections in accordance with the coherence bandwidth, andtransmit, to a network receiver, the Grassmannian symbol sections on subchannels within the coherence bandwidth. Each of the Grassmannian symbol sections is transmitted on one of the subchannels within the coherence bandwidth.

In an embodiment, channel coefficients between transmit antennas of the network transmitter and receiver antennas of the network receiver are correlated for a duration of the channel coherence time and across the subchannels within the coherence bandwidth.

In an embodiment, the network transmitter further includes a number of transmit antennas. The Grassmannian symbol is structured as a matrix having dimensions up to a number of symbols within the equivalent coherence time by the number of transmit antennas, and each of the Grassmannian symbol sections is structured as a submatrix having dimensions of a number of symbols within the channel coherence time by the number of transmit antennas.

In an embodiment, a number of symbols within the equivalent coherence time is a product of a number of symbols within the channel coherence time and a number of utilized subchannels within the coherence bandwidth, wherein the number of utilized subchannels within the coherence bandwidth is greater than one and up to a total number of subchannels within the coherence bandwidth.

An embodiment method for communicating in a broadband network includes determining, by a first network device in the broadband network, a channel coherence time and a coherence bandwidth of the broadband network and receiving, by the first network device, Grassmannian symbol sections from a second network device on subchannels within the coherence bandwidth. The method further includes determining, by the first network device, a Grassmannian symbol in accordance with a combination of the Grassmannian symbols sections. The Grassmannian symbol is structured in accordance with the channel coherence time and the coherence bandwidth.

In an embodiment, receiving the Grassmannian symbol sections may include receiving each of the Grassmannian symbol sections on a different subchannel within the coherence bandwidth.

In an embodiment, determining the Grassmannian symbol may include concatenating the Grassmannian symbol sections.

In an embodiment, determining the channel coherence time and the coherence bandwidth may include measuring pilot signals and determining the channel coherence time and the coherence bandwidth in accordance with the pilot signals.

The method may further include reporting the channel coherence time and the coherence bandwidth to the second network device. Reporting the channel coherence time includes reporting one of a plurality of predefined channel coherence time and coherence bandwidth combinations known by the first network device and the second network device.

In an embodiment, reporting the channel coherence time and the coherence bandwidth to the second network device may include reporting the channel coherence time and the coherence bandwidth to the second network device when the first network device is granted network access or during a feedback interval.

In an embodiment, determining the channel coherence time and the coherence bandwidth includes measuring sounding signals and determining the channel coherence time and the coherence bandwidth in accordance with the sounding signals.

In an embodiment, determining the channel coherence time and the coherence bandwidth includes receiving the channel coherence time and the coherence bandwidth in a report from the second network device.

In an embodiment, the Grassmannian symbol is structured as a matrix having dimensions of an equivalent coherence time by a number of transmit antennas at the second network device. The equivalent coherence time is a product of a number of symbols within the channel coherence time and a number of utilized subchannels within the coherence bandwidth.

An embodiment network receiver in a broadband network includes a processor and a computer readable storage medium storing programming for execution by the processor. The programming including instructions to determine a channel coherence time and a coherence bandwidth of the broadband network, receive Grassmannian symbol sections from a network transmitter, wherein each of the Grassmannian symbol sections are received on a different subchannel within the coherence bandwidth, and determine a Grassmannian symbol in accordance with a concatenation of the Grassmannian symbols sections. The Grassmannian symbol is structured in accordance with the channel coherence time and the coherence bandwidth.

In an embodiment, the Grassmannian symbol is structured as a matrix having dimensions of an equivalent coherence time by a number of transmit antennas at the network transmitter. The equivalent coherence time is a product of a number of symbols within the channel coherence time and a number of subchannels within the coherence bandwidth.

In an embodiment, channel coefficients between transmit antennas of the network transmitter and receive antennas of the network receiver are correlated during the channel coherence time and on the subchannels within the coherence bandwidth.

In an embodiment, the network receiver is unaware of instantaneous channel coefficients.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for communicating in a broadband network, the method comprising:
   determining, by a first network device, an equivalent coherence time of a corresponding narrowband network, having a coherence bandwidth equal to a bandwidth of a single channel, in accordance with a broadband channel coherence time and a number of utilized subchannels within a broadband coherence bandwidth of the broadband network, wherein the number of utilized subchannels within the broadband coherence bandwidth is greater than one and up to a total number of subchannels within the broadband coherence bandwidth;
   structuring, by the first network device, a Grassmannian symbol in accordance with the equivalent coherence time of the corresponding narrowband network;
   generating, by the first network device, Grassmannian symbol sections by partitioning the Grassmannian symbol in accordance with the broadband coherence bandwidth; and
   transmitting, by the first network device to a second network device, the Grassmannian symbol sections on selected subchannels within the broadband coherence bandwidth.

2. The method of claim 1, wherein determining the equivalent coherence time of the corresponding narrowband network comprises taking a product of the broadband channel coherence time and the number of utilized subchannels within the broadband coherence bandwidth.

3. The method of claim 1, wherein transmitting the plurality of Grassmannian symbol sections comprises transmitting each of the Grassmannian symbol sections on a different one of the selected subchannels within the broadband coherence bandwidth.

4. The method of claim 1, further comprising receiving the broadband channel coherence time and the number of utilized subchannels within the broadband coherence bandwidth in a report from the second network device.

5. The method of claim 4, wherein the report is received when the second network device is granted network access or during a feedback interval.

6. The method of claim 1, wherein determining the broadband channel coherence time and the number of utilized subchannels within the broadband coherence bandwidth comprises:
   measuring, by the first network device, sounding signals transmitted from the second network device;
   selecting, by the first network device, the broadband channel coherence time and the number of utilized subchannels within the broadband coherence bandwidth in accordance with the sounding signals; and
   reporting the broadband channel coherence time and the number of utilized subchannels within its broadband coherence bandwidth, selected by the first network device, to the second network device.

7. The method of claim 6, wherein reporting the broadband channel coherence time and the number of utilized subchannels within the broadband coherence bandwidth comprises reporting the broadband channel coherence time and the number of utilized subchannels within the broadband coherence bandwidth, selected by the first network device, during a dynamic control signaling for resource scheduling phase.

8. The method of claim 1, wherein determining the broadband channel coherence time and the number of utilized subchannels within the broadband coherence bandwidth comprises:
   measuring, by the first network device, downlink pilot signals, training sequences, or a combination thereof, wherein the first network device is a wireless device;
   determining the broadband channel coherence time and the number of utilized subchannels within the broadband coherence bandwidth in accordance with the downlink pilot signals, the training sequences, or the combination thereof; and
   reporting the broadband channel coherence time and the number of utilized subchannels within the broadband coherence bandwidth to the second network device, wherein the second network device is an access point.

9. The method of claim 1, wherein the first network device comprises a plurality of predefined Grassmannian constellations, wherein the Grassmannian symbol is one of a plurality of Grassmannian symbols within the plurality of predefined Grassmannian constellations, wherein the method further comprises selecting, by the first network device, the Grassmannian symbol in accordance with a channel quality index, the broadband channel coherence time, the broadband coherence bandwidth, or a combination thereof.

10. A network transmitter in a broadband network, the network transmitter comprising:
   a processor; and
   a computer readable storage medium storing programming for execution by the processor, the programming including instructions to:
      determine an equivalent coherence time of a corresponding narrowband network, having a coherence bandwidth equal to a bandwidth of a single channel, in accordance with a broadband channel coherence time and a number of utilized subchannels within a broadband coherence bandwidth of the broadband network, wherein the number of utilized subchannels within the broadband coherence bandwidth is greater than one and up to a total number of subchannels within the broadband coherence bandwidth;
      structure a Grassmannian symbol in accordance with the equivalent coherence time of the corresponding narrowband network;
      partition the Grassmannian symbol into a number of Grassmannian symbol sections in accordance with the broadband coherence bandwidth; and
      transmit, to a network receiver, the Grassmannian symbol sections on selected subchannels within the broadband coherence bandwidth, wherein each of the Grassmannian symbol sections is transmitted on one of the selected subchannels within the broadband coherence bandwidth.

11. The network transmitter of claim 10, wherein channel coefficients between transmit antennas of the network transmitter and receiver antennas of the network receiver are correlated for a duration of the broadband channel coherence time and across the selected subchannels within the broadband coherence bandwidth.

12. The network transmitter of claim 10, wherein the network transmitter further comprises a number of transmit antennas, wherein the Grassmannian symbol is structured as a matrix having dimensions up to a number of symbols within the equivalent coherence time of the corresponding narrowband network by the number of transmit antennas, and wherein each of the Grassmannian symbol sections is structured as a submatrix having dimensions of a number of symbols within the broadband channel coherence time by the number of transmit antennas.

13. The network transmitter of claim 10, wherein a number of symbols within the equivalent coherence time of the corresponding narrowband network is a product of a number of symbols within the broadband channel coherence time and a number of utilized subchannels within the broadband coherence bandwidth.

14. A method for communicating in a broadband network, the method comprising:
determining, by a first network device in the broadband network, a broadband channel coherence time and a broadband coherence bandwidth of the broadband network;
receiving, by the first network device, Grassmannian symbol sections from a second network device on selected subchannels within the broadband coherence bandwidth; and
determining, by the first network device, a Grassmannian symbol using a combination of the Grassmannian symbols sections, wherein the Grassmannian symbol is structured in accordance with an equivalent coherence time of a corresponding narrowband network, having a coherence bandwidth equal to a bandwidth of a single channel, wherein the equivalent coherence time of the corresponding narrowband network is based on the broadband channel coherence time and a number of utilized subchannels within the broadband coherence bandwidth of the broadband network, and wherein the number of utilized subchannels within the broadband coherence bandwidth is greater than one and up to a total number of subchannels within the broadband coherence bandwidth.

15. The method of claim 14, wherein receiving the Grassmannian symbol sections comprises receiving each of the Grassmannian symbol sections on a different selected subchannel within the broadband coherence bandwidth.

16. The method of claim 14, wherein determining the Grassmannian symbol comprises concatenating the Grassmannian symbol sections.

17. The method of claim 14, wherein determining the broadband channel coherence time and the broadband coherence bandwidth comprises:
measuring pilot signals;
determining the broadband channel coherence time and the broadband coherence bandwidth in accordance with the pilot signals; and
reporting the broadband channel coherence time comprising reporting one of a plurality of predefined broadband channel coherence time and broadband coherence bandwidth combinations known by the first network device and the second network device.

18. The method of claim 17, wherein reporting the broadband channel coherence time and the broadband coherence bandwidth to the second network device comprises reporting the broadband channel coherence time and the broadband coherence bandwidth to the second network device when the first network device is granted network access or during a feedback interval.

19. The method of claim 14, wherein determining the broadband channel coherence time and the broadband coherence bandwidth comprises:
measuring sounding signals; and
determining the broadband channel coherence time and the broadband coherence bandwidth in accordance with the sounding signals.

20. The method of claim 14, wherein determining the broadband channel coherence time and the broadband coherence bandwidth comprises receiving the broadband channel coherence time and the broadband coherence bandwidth in a report from the second network device.

21. A network receiver in a broadband network, the network receiver comprising:
a processor; and
a computer readable storage medium storing programming for execution by the processor, the programming including instructions to:
determine a broadband channel coherence time and a broadband coherence bandwidth of the broadband network;
receive Grassmannian symbol sections from a network transmitter, wherein each of the Grassmannian symbol sections are received on a different selected subchannel within the broadband coherence bandwidth; and
determine a Grassmannian symbol using a concatenation of the Grassmannian symbols sections, wherein the Grassmannian symbol is structured in accordance with an equivalent coherence time of a corresponding narrowband network, having a coherence bandwidth equal to a bandwidth of a single channel, wherein the equivalent coherence time of the corresponding narrowband network is based on the broadband channel coherence time and a number of utilized subchannels within the broadband coherence bandwidth of the broadband network, and wherein the number of utilized subchannels within the broadband coherence bandwidth is greater than one and up to a total number of subchannels within the broadband coherence bandwidth of the broadband network.

22. The network receiver of claim 21, wherein the Grassmannian symbol is structured as a matrix having dimensions of an equivalent coherence time of the corresponding narrowband network by a number of transmit antennas at the network transmitter, wherein the equivalent coherence time of the corresponding narrowband network is a product of a number of symbols within the broadband channel coherence time and the number of utilized subchannels within the broadband coherence bandwidth.

23. The network receiver of claim 22, wherein channel coefficients between transmit antennas of the network transmitter and receive antennas of the network receiver are correlated during the broadband channel coherence time and on the selected subchannels within the broadband coherence bandwidth.

* * * * *